UNITED STATES PATENT OFFICE.

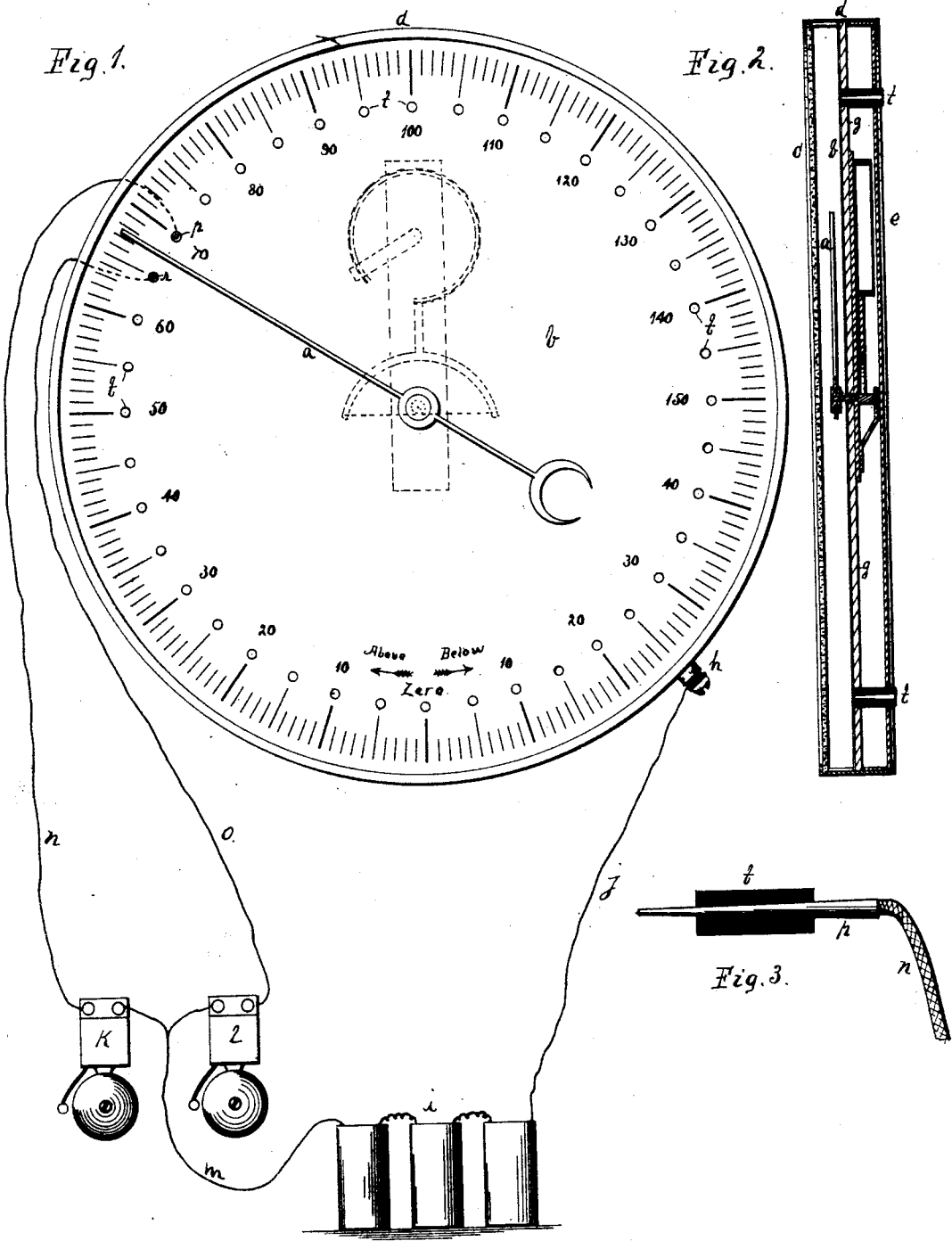

DAVID S. SCHUREMAN, OF ROCKFORD, ILLINOIS.

ELECTRIC ALARM.

SPECIFICATION forming part of Letters Patent No. 513,829, dated January 30, 1894.

Application filed May 6, 1893. Serial No. 473,317. (No model.)

*To all whom it may concern:*

Be it known that I, DAVID S. SCHUREMAN, a citizen of the United States, residing at Rockford, in the county of Winnebago and State of Illinois, have invented certain new and useful Improvements in Electric Alarms, of which the following is a specification.

The object of this invention is to utilize the dial thermometer for forming an electric connection on each side of the pointer, in the circuits of which are located two bells thereby sounding an alarm according to which circuit is closed and is designed especially for regulating the temperature in school houses by notifying the person having charge of the heating apparatus of a change in the temperature varying, for instance 5°.

In the accompanying drawings,—Figure 1 is a front view of the dial with the battery and alarm connections. Fig. 2 is a vertical section through the center of the dial. Fig. 3 is a detail showing the plug and its bushing detached from the dial.

The thermometer is of the dial variety and consists of the operating mechanism by which a pointer $a$, is moved or oscillated according to the rise or fall in the temperature. This pointer moves over a fixed dial $b$, and over the dial is located a crystal $c$. These parts are supported by a rim $d$, and a back $e$, protects the parts from dust, &c. In this instance I have formed holes through the dial supporting plate for the operating mechanism, and through the back at each of the main divisions of 5° apart are insulated bushings $f$, having a connection with the supporting plate $g$, extending beyond the face of the back plate $e$, and to the rim is secured a binding post $h$. An open circuit battery $i$, has a connection with the binding post by a wire $j$, and bells $k$, and $l$, have a connection with the battery by a wire $m$, and from the bell run wires $n$, and $o$, the former having a plug $p$, connected to its free end and the latter a plug $r$, connected to its free end.

The thermometer is located in the room, the temperature of which is to be regulated, and if held between 65° and 70° the plug $r$, is placed in the insulating bushing corresponding to 65°, and the plug $p$, is placed in the bushing corresponding to 70°, and the bells being located in proper position to be observed by the attendant upon the heating apparatus. Should the temperature in the room in which the thermometer is located fall to 65°, the pointer would lie in contact with plug $r$, closing an electric circuit including the battery $i$, and bell $l$, causing the bell to ring, notifying the attendant upon the heating apparatus that the temperature had fallen, and more heat was needed in the room, and bell $k$, would ring when the temperature rises to 70° the pointer closing the circuit with the plug $p$. The plugs can be inserted in any of the bushings $f$, and the attendant can properly regulate the temperature between certain predetermined degrees and he will know by the ringing of the bells which way the pointer is moving. It will be noticed that the central openings of the bushings are conical, being larger at their rear faces, and that the plugs are also tapering, and by this construction the plugs are firmly held in position, and will only extend beyond the face of the dial $a$ proper distance to receive the pointer in its movements. When a number of rooms are thus connected, annunciators can be used, one for each series of plugs.

I claim as my invention—

1. A thermometer having a dial of conducting material, and insulated bushings extending through and attached to the face of the dial.

2. A thermometer having a dial of conducting material, insulated bushings extending through and attached to the face of the dial, two bells, a battery, a wire connecting the battery and thermometer, the bells electrically connected with the battery and plugs extending through the bushings and electrically connected with the bells.

DAVID S. SCHUREMAN.

Witnesses:
 A. O. BEHEL,
 E. BEHEL.